(12) United States Patent  
Nefcy et al.

(10) Patent No.: US 10,239,515 B2  
(45) Date of Patent: Mar. 26, 2019

(54) HYBRID VEHICLE AND METHOD OF DISENGAGING AN OVERDRIVE CLUTCH IN A HYBRID VEHICLE

(71) Applicant: FORD GLOBAL TECHNOLOGIES, LLC, Dearborn, MI (US)

(72) Inventors: Bernard D. Nefcy, Novi, MI (US); Daniel Scott Colvin, Farmington Hills, MI (US); Luke Ottaway, Hollidaysburg, PA (US); Walter Joseph Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 908 days.

(21) Appl. No.: 14/598,802

(22) Filed: Jan. 16, 2015

(65) Prior Publication Data

US 2016/0207525 A1   Jul. 21, 2016

(51) Int. Cl.

| | |
|---|---|
| *B60W 20/40* | (2016.01) |
| *B60W 10/06* | (2006.01) |
| *B60K 6/36* | (2007.10) |
| *B60W 10/08* | (2006.01) |
| *B60W 10/02* | (2006.01) |
| *B60K 6/383* | (2007.10) |
| *B60K 6/445* | (2007.10) |
| *B60K 6/38* | (2007.10) |
| *B60W 50/00* | (2006.01) |

(52) U.S. Cl.
CPC ............ *B60W 20/40* (2013.01); *B60K 6/36* (2013.01); *B60K 6/383* (2013.01); *B60K 6/445* (2013.01); *B60W 10/02* (2013.01); *B60W 10/08* (2013.01); *B60K 2006/381* (2013.01); *B60W 2050/004* (2013.01); *B60W 2510/0208* (2013.01); *B60W 2710/083* (2013.01); *Y02T 10/6239* (2013.01); *Y10S 903/913* (2013.01); *Y10S 903/946* (2013.01)

(58) Field of Classification Search
None
See application file for complete search history.

(56) References Cited

U.S. PATENT DOCUMENTS

| | | | |
|---|---|---|---|
| 6,258,006 B1 * | 7/2001 | Hanyu | B60K 6/365 475/5 |
| 7,086,977 B2 * | 8/2006 | Supina | B60K 6/365 475/207 |
| 7,743,678 B2 | 6/2010 | Wittkopp et al. | |
| 8,011,464 B2 | 9/2011 | Samie et al. | |
| 8,091,696 B2 | 1/2012 | Wittkopp et al. | |
| 8,307,925 B2 | 11/2012 | Tang et al. | |
| 2008/0223681 A1 | 9/2008 | Stevenson et al. | |
| 2013/0296108 A1 | 11/2013 | Ortmann et al. | |

(Continued)

*Primary Examiner* — Colby M Hansen  
(74) *Attorney, Agent, or Firm* — David Kelley; Brooks Kushman P.C.

(57) ABSTRACT

A vehicle includes an engine and electric machine connected to a planetary gear, a one-way clutch, and a controller. The one-way clutch transfers torque from the planetary gear to an overdrive gear. The controller, in response to a condition requiring disengagement of the one-way clutch, increases a torque of the electric machine based on a torque command for the electric machine and the torque transferred from the planetary gear to the overdrive gear.

16 Claims, 11 Drawing Sheets

(56) References Cited

U.S. PATENT DOCUMENTS

| | | | |
|---|---|---|---|
| 2014/0094336 A1* | 4/2014 | Versteyhe | B60K 6/40 475/8 |
| 2016/0096522 A1* | 4/2016 | Ortmann | B60K 6/36 477/5 |

* cited by examiner

HYBRID VEHICLE AND METHOD OF DISENGAGING AN OVERDRIVE CLUTCH IN A HYBRID VEHICLE

TECHNICAL FIELD

The present disclosure relates to powertrains for hybrid electric vehicles.

BACKGROUND

One class of hybrid electric vehicle powertrains, commonly referred to as a powersplit powertrain, has two sources of power. The first source includes an internal combustion engine, and the second source includes a combination of an electric motor, a generator and a battery. The engine and the generator, together with a planetary gear set, a countershaft and a motor, establish a mechanical torque flow path and an electromechanical torque flow path to vehicle traction wheels. The battery is an energy-storing device for the generator and the motor. Engine power is divided into two power flow paths at any generator speed and vehicle speed. Engine speed is controlled by the generator, which implies that the engine speed can be decoupled from the vehicle speed within the allowed speed range of the generator. This mode of operation is called "positive power split", when the generator is generating electrical power using mechanical power input from the engine.

Because of the mechanical properties of the planetary gear set, the generator can distribute power to the planetary gear set to drive the vehicle. This mode of operation is called "negative power split". The combination of a generator, a motor and a planetary gear set thus can be considered to have electrical continuously variable (e-CVT) transmission characteristics.

A generator brake can be activated so that engine output power is transmitted with a fixed gear ratio to the torque output side of the powertrain through a mechanical path only. The first power source can only affect forward propulsion of the vehicle since there is no reverse gear. The engine requires either generator control or application of a generator brake to transmit output power for forward drive.

When the second power source is active, the electric motor draws power from the battery and drives the vehicle independently of the engine for both forward drive and reverse drive. The motor may also generate power and charge the battery if the engine produces power exceeding driver demand, or in a regenerative mode capturing vehicle kinetic energy. In addition, the generator can draw power from the battery and drive against a one way clutch on the engine power output shaft to propel the vehicle in a forward direction. This mode of operation is called "generator drive mode". A vehicle system controller coordinates the two power sources so that they work together seamlessly to meet a driver's torque demand without exceeding powertrain system limits. The vehicle system controller allows continuous regulation of engine speed for any given vehicle speed and power request. The mechanical power flow path provides efficient power delivery through the planetary gear set to the driveshaft.

SUMMARY

In one example, a vehicle includes an engine and electric machine connected to a planetary gear, a one-way clutch configured to transfer torque from the planetary gear to an overdrive gear, and a controller. The controller, in response to a condition requiring disengagement of the one-way clutch, increases a torque of the electric machine based on the torque transferred from the planetary gear to the overdrive gear.

In another example, a hybrid vehicle includes a planetary gear set, an engine, an overdrive gear, a one-way clutch, a generator, and a controller. The planetary gear set has a sun gear, a carrier gear, and a ring gear. The ring gear is configured to transfer torque to a traction wheel. The engine is connected to the carrier gear and is configured to transfer torque to the planetary gear set. The overdrive gear is configured to transfer torque from the engine to the traction wheel. The one-way clutch is configured to transfer torque from the planetary gear set to the overdrive gear when switching between powertrain nominal and overdrive operation modes. The generator is connected to the sun gear and is configured to overrun the one-way clutch when rotated in a disengagement direction. The controller, in response to a condition requiring switching from the powertrain overdrive mode to the powertrain nominal operation mode, alters a torque of the generator in the disengagement direction according to a torque command that is based on the torque transferred from the planetary gear set to the overdrive gear.

In yet another example, a method of controlling a vehicle is disclosed. The vehicle includes an engine and an electric machine connected to a planetary gear set, and a one-way clutch that is configured to transfer torque from the planetary gear set to an overdrive gear. In response to a condition requiring disengagement of the one-way clutch, a torque of the electric machine is increased based on the torque transferred from the planetary gear set to the overdrive gear.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
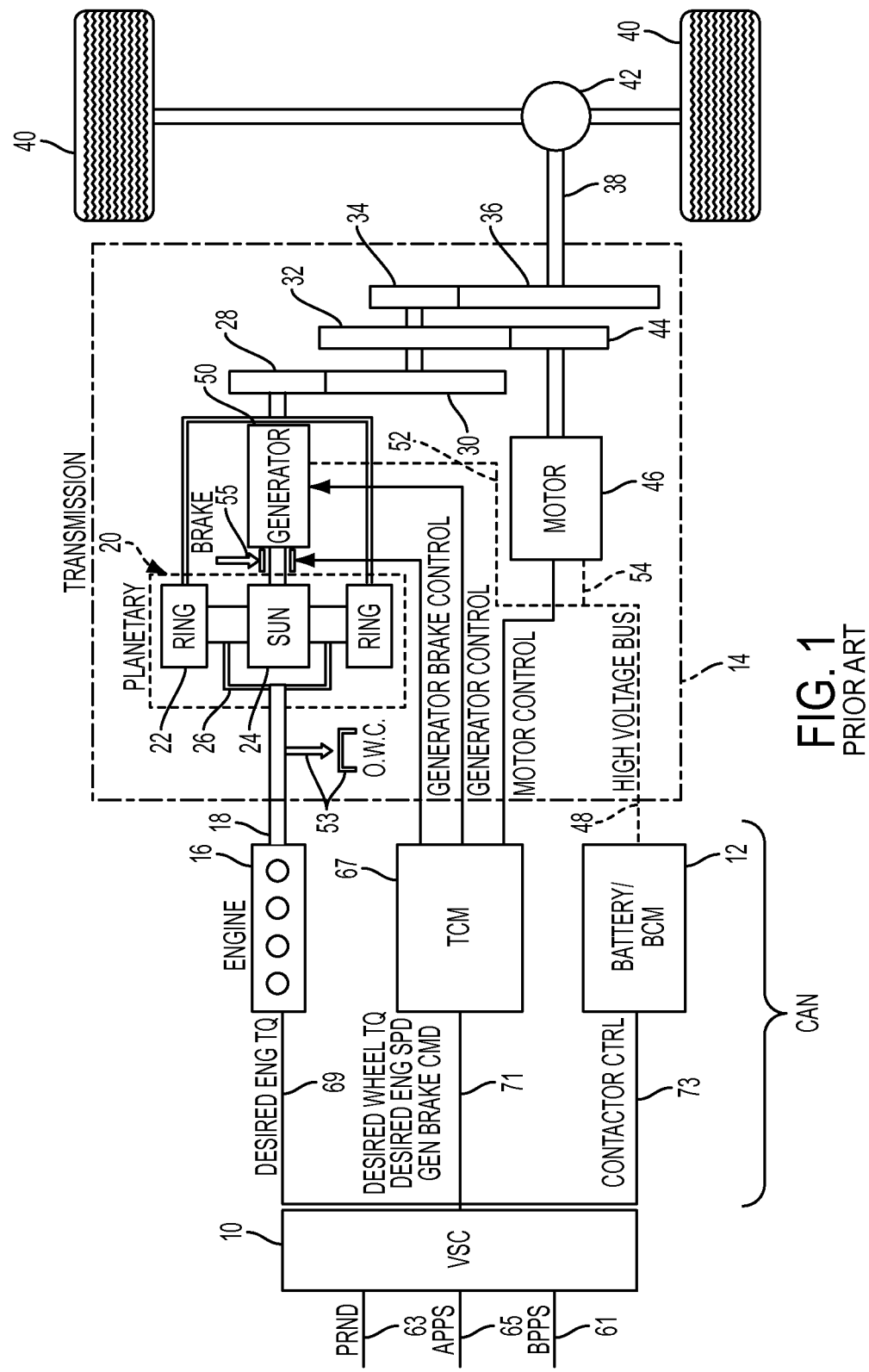
FIG. 1 illustrates a hybrid vehicle having a powersplit powertrain.

Referring now to FIG. 1, a hybrid electric vehicle having a powersplit powertrain is illustrated. The powertrain includes two power sources that are connected to the driveline: (1) an engine 16 and an electric-machine 50 (which may be referred to as a generator) connected together via a planetary gear arrangement 20; and (2) an electric drive system including a battery 12, an electric-machine 46 (which may be referred to as a motor) and generator 50. Battery 12 is an energy storage system for motor 46 and generator 50.

A vehicle system controller (VSC) 10 is configured to send control signals to and receive sensory feedback information from one or more of battery 12, engine 16, motor 46, and generator 50 in order for power to be provided to vehicle traction wheels 40 for propelling the vehicle. Controller 10 controls the power source proportioning between battery 12 and engine 16 for providing power to propel the vehicle and thereby controls the state of charge (SOC) of battery 12.

Transmission 14 includes planetary arrangement 20, which includes a ring gear 22, a sun gear 24, and a carrier assembly 26. Ring gear 22 distributes torque to step ratio gears comprising meshing gear elements 28, 30, 32, 34, and 36. A torque output shaft 38 of transmission 14 is driveably connected to wheels 40 through a differential-and-axle mechanism 42. Gears 30, 32, and 34 are mounted on a counter shaft 31 with gear 32 engaging a motor-driven gear 44. Motor 46 drives gear 44. Gear 44 acts as a torque input for counter shaft 31. Engine 16 distributes torque through input shaft 18 to transmission 14. Battery 12 delivers electric power to motor 46 through power flow path 48. Generator 50 is connected electrically to battery 12 and to motor 46, as shown at 52.

While battery 12 is acting as a sole power source with engine 16 off, input shaft 18 and carrier assembly 26 are braked by an overrunning coupling (i.e., one-way clutch (OWC)) 53. A mechanical brake 55 anchors the rotor of generator 50 and sun gear 24 when engine 16 is on and the powertrain is in a parallel drive mode, sun gear 24 acting as a reaction element.

Controller 10 receives a signal PRND (park, reverse, neutral, drive) from a transmission range selector 63, which is distributed to transmission control module (TCM) 67, together with a desired wheel torque, a desired engine speed, and a generator brake command, as shown at 71. A battery switch 73 is closed after vehicle "key-on" startup. Controller 10 issues a desired engine torque request to engine 16, as shown at 69, which is dependent on accelerator pedal position sensor (APPS) output 65. A brake pedal position sensor (BPPS) distributes a wheel brake signal to controller 10, as shown at 61. A brake system control module (not shown) may issue to controller 10 a regenerative braking command based on information from the BPPS. TCM 67 issues a generator brake control signal to generator brake 55. TCM 67 also distributes a generator control signal to generator 50.

Figure 2:
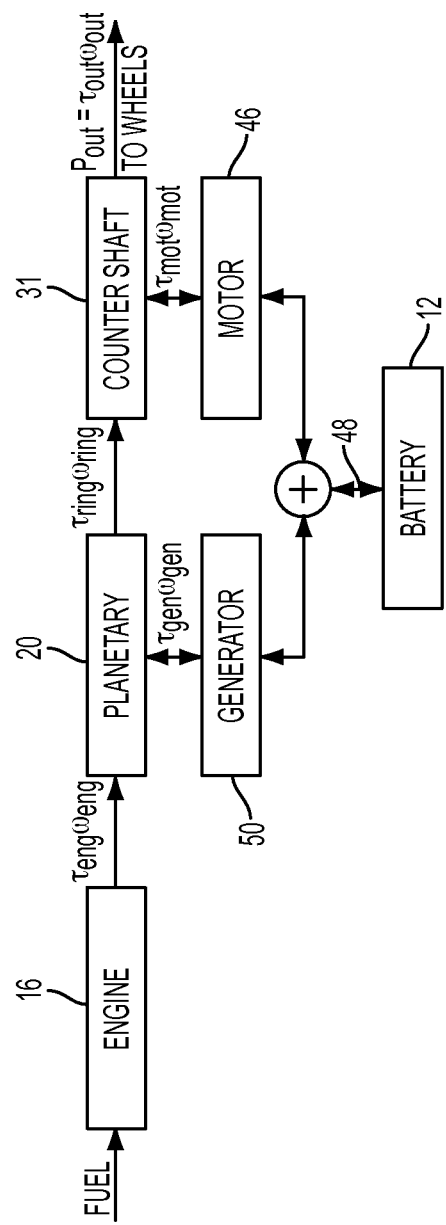
FIG. 2 illustrates torque and speed transmission through a powersplit powertrain.

Referring now to FIG. 2, a block diagram of power flow paths between the various components of the powertrain of FIG. 1 is shown. Fuel is delivered to engine 16 under the control of the driver using an engine throttle. Engine 16 delivers engine power ($\tau_{eng}\omega_{eng}$, where $\tau_{eng}$ is engine torque and $\omega_{eng}$ is engine speed) to planetary arrangement 20. Planetary 20 delivers power ($\tau_{ring}\omega_{ring}$, where $\tau_{ring}$ is the ring gear torque and $\omega_{ring}$ is the ring gear speed) to counter shaft 31. Output shaft 38 outputs power ($P_{out}=\tau_{out}\omega_{out}$, where $\tau_{out}$ and $\omega_{out}$ are the torque and speed of output shaft 38, respectively) to wheels 40. Generator 50 can deliver power to or be driven by planetary 20. Similarly, power distribution between motor 46 and counter shaft 31 can be distributed in either direction. Driving power from battery 12 or charging power to battery 12 is represented by the bi-directional arrow 48.

The engine output power ($\tau_{eng}\omega_{eng}$) can be split into a mechanical power flow path ($T_{ring}\omega_{ring}$) and an electrical power flow path ($\tau_{gen}\omega_{gen}$ to $\tau_{mot}\omega_{mot}$, where $\tau_{gen}$ is the generator torque, $\omega_{gen}$ is the generator speed, $\omega_{mot}$ is the motor torque, and $\tau_{mot}$ is the motor speed). In this so-called positive split mode of operation, engine 16 delivers power to planetary 20 which delivers power ($\tau_{ring}\omega_{ring}$) to counter shaft 31 which in turn drives wheels 40. A portion of the planetary gearing power ($\tau_{gen}\omega_{gen}$) is distributed to generator 50, which delivers charging power to battery 12. Battery 12 drives motor 46, which distributes power ($\tau_{mot}\omega_{mot}$) to counter shaft 31.

If generator brake 55 is activated, a parallel operating mode is established. In the parallel operating configuration, engine 16 is on and generator 50 is braked. Battery 12 powers motor 46, which powers counter shaft 31 simultaneously with delivery of power from engine 16 to planetary 20 to counter shaft 31. During operation with the second power source (described as including battery 12, motor 46, and generator 50), motor 46 draws power from battery 12 and provides propulsion independently from engine 16 to the drivetrain.

As described, the HEV has two power sources for delivering driving power to wheels 40. The first power source includes engine 16 and the second power source includes battery 12. Engine 16 and battery 12 can provide traction power either simultaneously or independently. Controller 10 controls the electric energy and fuel energy proportioning to meet the propulsion requirements and thereby controls engine 16 and battery 12 accordingly.

As may be observed, the planetary gearing arrangement 20 imposes speed and torque relationships among the engine 16, generator 50, and the vehicle traction wheels 40. As discussed above, the generator 50 may be controlled to transfer power from the engine 16 to vehicle traction wheels 40 using the planetary gearing arrangement 20 as a CVT. However, at some operating conditions, the losses incurred by operating the generator 50 exceed the energy benefit of the CVT.

As an example, when the vehicle is in "steady state" operation, such as cruising at a generally constant speed, the generator 50 incurs operational losses, which may exceed one kW, while the gear ratio between the engine 16 and traction wheels 40 remains generally unchanged. Here, steady state operation refers to a constant vehicle speed, constant driver power request, and generally consistent quantity of engine power used to charge the vehicle. This generally occurs when the driver power demand is roughly the same as the "road load", or the sum of forces acting on the vehicle (e.g. rolling resistance, aerodynamic drag, etc.).

Figure 3:
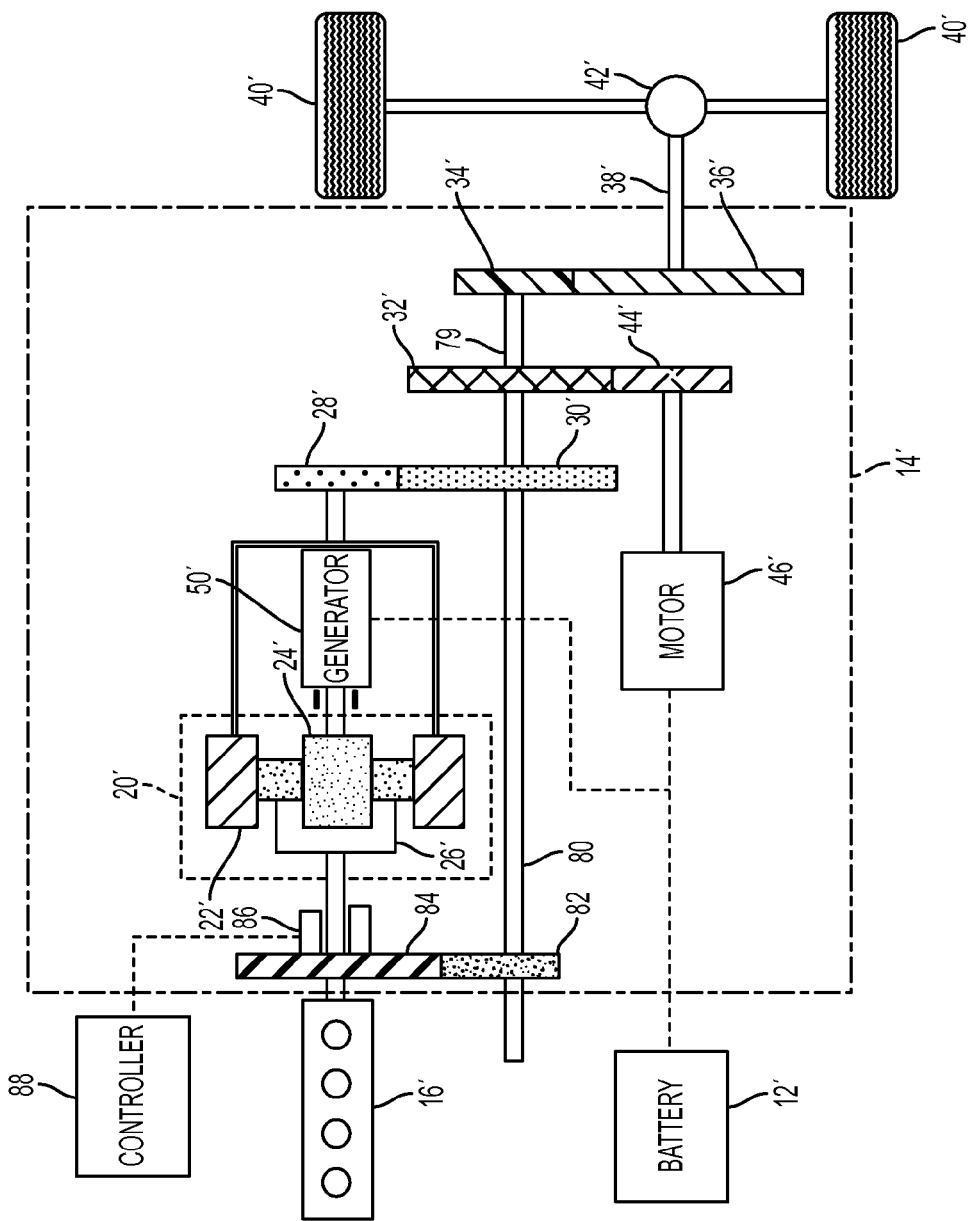
FIG. 3 illustrates a hybrid vehicle having a powertrain according to the present disclosure.

Referring now to FIG. 3, a powertrain according to the present disclosure is illustrated. The powertrain includes two power sources that are connected to the transmission 14' and driveline: (1) an engine 16' and a generator 50' connected together via a planetary gear arrangement 20'; and (2) an electric drive system including a battery 12', an electric motor 46', and generator 50'. The planetary gear arrangement 20' may include a ring gear 22', a sun gear 24', and a carrier assembly 26'. The engine 16' may be coupled to the carrier assembly 26' and the generator 50' may be coupled to the sun gear 24'. The planetary gearing arrangement 20', in conjunction with meshing gear elements 28', 30', 32', 34', and 36', define a first mechanical linkage between the engine 16', generator 50', and traction wheels 40'. A mechanical linkage is defined between the motor 46' and the traction wheels 40' through meshing gear elements 44' and 32', output shaft 79, and meshing gear elements 34' and 36'. Meshing gear elements 30', 32', and 34' rotate about a common output shaft 79, and meshing gear elements 34' and 36' define a final drive ratio between the output shaft 79 and the output shaft 38'. The output shaft 38' of the transmission 14' is driveably connected to wheels 40' through a differential-and-axle mechanism 42'.

In addition, the powertrain includes a parallel overdrive shaft 80 fixedly coupled to gear element 30' for joint rotation with the output shaft 79. The overdrive shaft 80 is coupled to gear element 82, which is in meshing rotation with gear element 84. An overdrive clutch 86 is operable to selectively couple gear element 84 to the engine 16', and transfer torque off of the planetary gear arrangement 20' and onto an overdrive gearing arrangement. The overdrive clutch 86 includes an engagement mechanism to transfer the torque off of the planetary gear arrangement 20' and onto an overdrive gearing arrangement. Examples of the engagement mechanism include, but are not limited to, dog clutches and one-way clutches, such as an electronically controlled rocker one-way clutches. Meshing gearing elements 84 and 82 have a fixed gear ratio configured to define an overdrive speed and torque relationship between the engine 16' and the output shaft 79 when the overdrive clutch 86 is engaged. A controller 88 is configured to selectively command the overdrive clutch 86 to engage or disengage in response to various operating conditions, as will be discussed below with respect to FIG. 4. Other gearing arrangements that impose an overdrive speed relationship between the engine 16' and output shaft 79 may, of course, be used.

Figure 4:
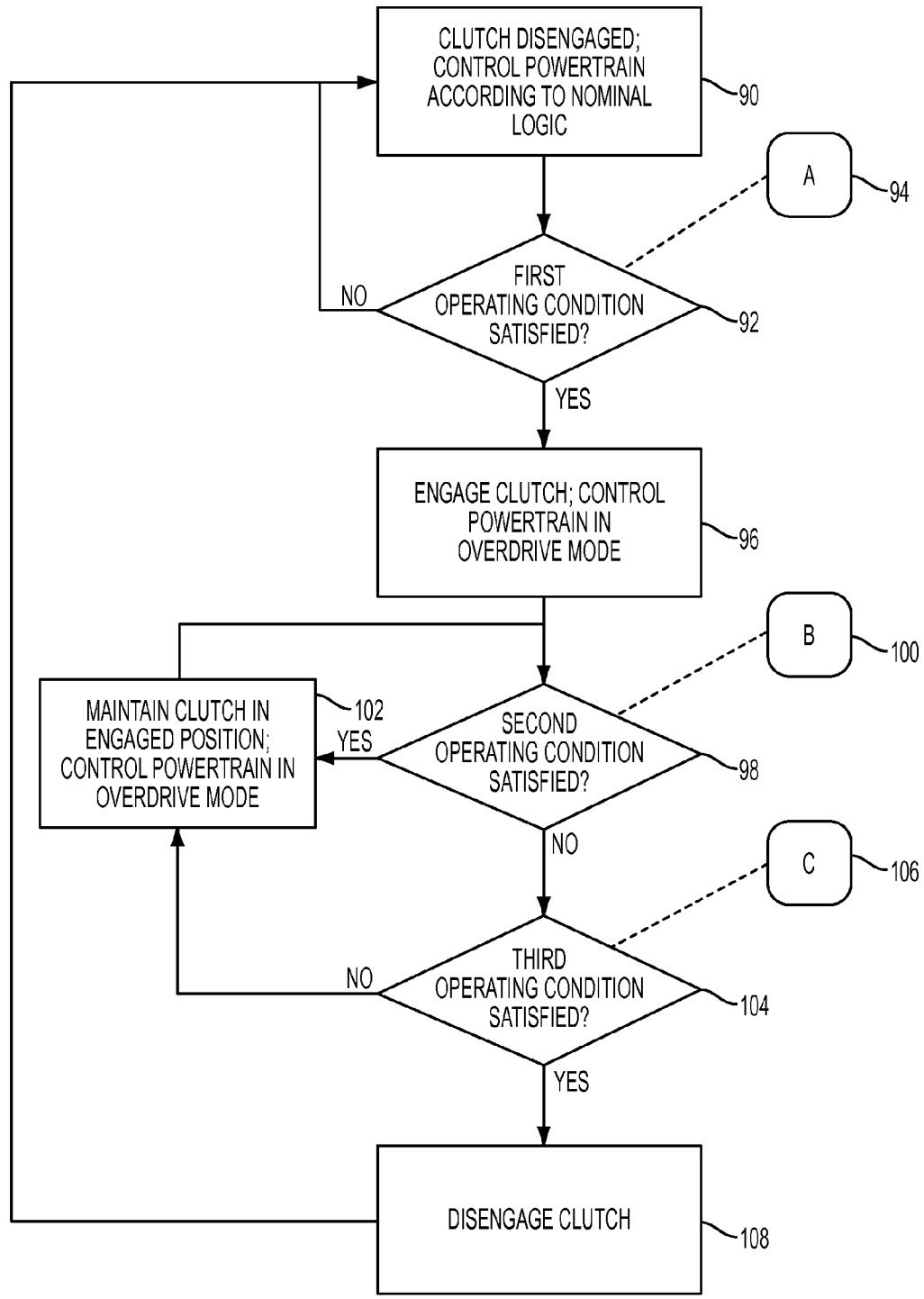
FIGS. 4 and 9 illustrate algorithms for controlling a powertrain according to the present disclosure in flowchart form.
Figure 4:
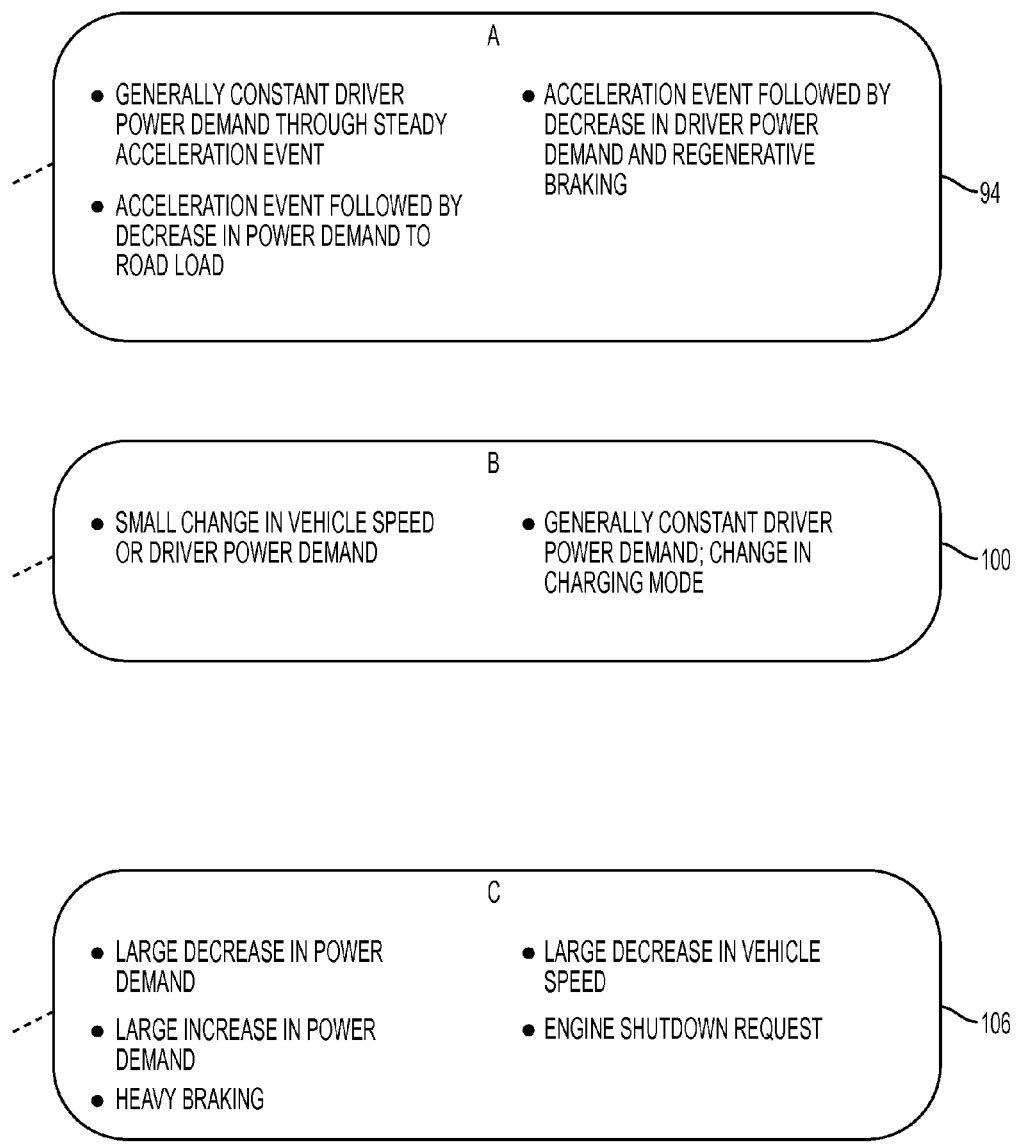

Referring now to FIG. 4, a method of controlling operation of the powertrain is illustrated in flowchart form. The hybrid vehicle powertrain is operated according to a nominal logic (or a nominal operation mode) with the clutch disengaged, as illustrated at block 90. A determination is then made of whether a first operating condition is satisfied, as illustrated at operation 92. The first operating condition generally corresponds to a change from non-steady state operation to steady state operation, or to a decrease in magnitude of a difference between a driver power demand and the road load. The first operating condition may be one of the operating conditions of list A, illustrated at block 94. The first operating condition may be a generally constant driver power demand through a first steady acceleration event. The first operating condition may also be a second acceleration event followed by a decrease in power demand to be generally equal to road load. The first acceleration event may also be a third acceleration event followed by a decrease in driver power demand and activation of regenerative braking. It should be noted that with respect to the acceleration events, "first", "second", and "third" are used for the sake of clarity, and not to indicate any sequence or requirement of co-incidence. If the first operating condition is not satisfied, control returns to block 90. If the first operating condition is satisfied, the clutch is engaged and the powertrain is controlled in overdrive mode, as illustrated at block 96.

A determination is then made of whether a second operating condition is satisfied, as illustrated at operation 98. The second operating condition generally corresponds to continuing in steady state operation, or to a generally constant difference between driver power demand and road load. The second operating condition may be one of the operating conditions of list B, illustrated at block 100. The second operating condition may include a small deviation in vehicle speed or driver power demand. In some embodiments, a speed deviation threshold or power demand deviation threshold may be provided. In such embodiments, speed or power demand deviations that do not exceed the respective thresholds may satisfy the second operating condition. The second operating condition may also be a generally constant driver power demand with a change in vehicle charging mode. In some speed and torque ranges charging is more efficient using a motor, and in other ranges charging is more efficient using a generator. A switch from motor charging to generator charging or from generator charging to motor charging, in conjunction with a generally constant driver power demand, would thus satisfy the second operating condition. Similarly, a change from a "not charging" mode to a charging mode, in conjunction with a generally constant driver power demand, would thus satisfy the second operating condition. If a determination is made that the second operating condition is satisfied, then the clutch is maintained in the engaged position, as illustrated at block 102. Control then returns to operation 98. The powertrain is thus controlled in overdrive mode while steady state operation continues.

If a determination is made that the second operating condition is not satisfied, then a determination is made of whether a third operating condition is satisfied, as illustrated at block 104. The third operating condition generally corresponds to a change from steady state operation to non-steady state operation, or to an increase in magnitude of the difference between driver power demand and road load. The third operating condition may be one of the operating conditions of list C, illustrated at block 106. The third operating condition may be a large decrease in power demand or a large increase in power demand. In some embodiments, a power demand deviation threshold is provided, and the third operating condition is satisfied if a driver power demand deviation exceeds the threshold. This may include a first threshold for decreases in power demand and a second threshold for increases in power demand. The third operating condition may also be a heavy application of vehicle brakes. In some embodiments, a braking threshold is provided, and the third operating condition is satisfied if a driver brake application exceeds the threshold. The third operating condition may also be a large decrease in vehicle speed. In some embodiments, a speed deviation threshold is provided, and the third condition is satisfied if a decrease in vehicle speed exceeds the threshold. The third operating condition may be an engine shutdown request. If a battery state of charge is sufficient to support electric operation and an engine shutdown request is issued, the third condition is satisfied. If a determination is made that the third operating condition is not satisfied, control proceeds to block 102. If the third operating condition is satisfied, the clutch is disengaged, as illustrated at block 108. Control then returns to block 90.

While illustrated as one controller, the controller 88 may be part of a larger control system and may be controlled by various other controllers throughout the vehicle, such as a vehicle system controller (VSC). It should therefore be understood that the controller 88 and one or more other controllers can collectively be referred to as a "controller" that controls various actuators in response to signals from various sensors to control various functions. Controller 88 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

Figure 5:
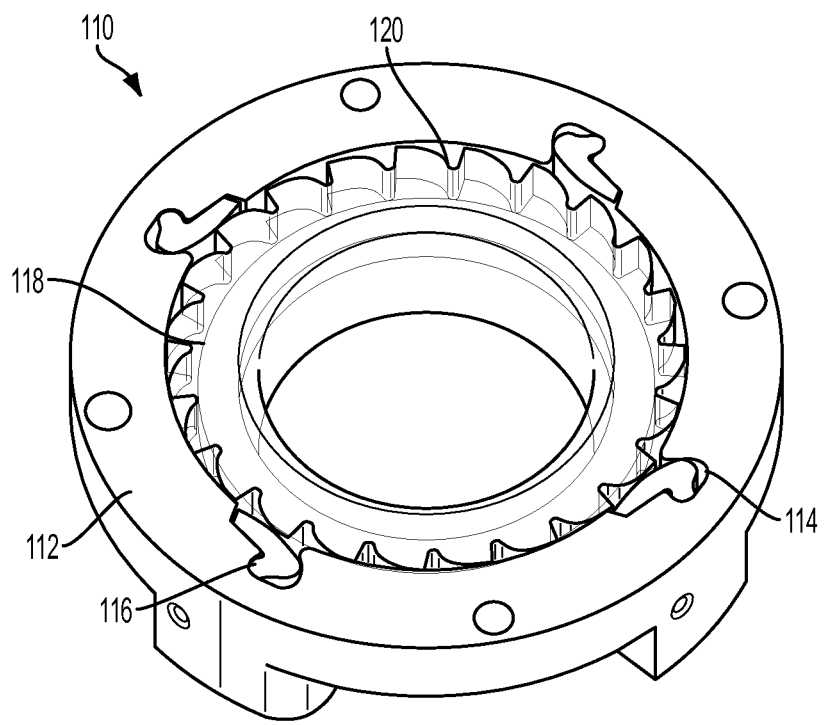
FIG. 5 is a schematic view of an electromagnetic one-way clutch.
Figure 6:
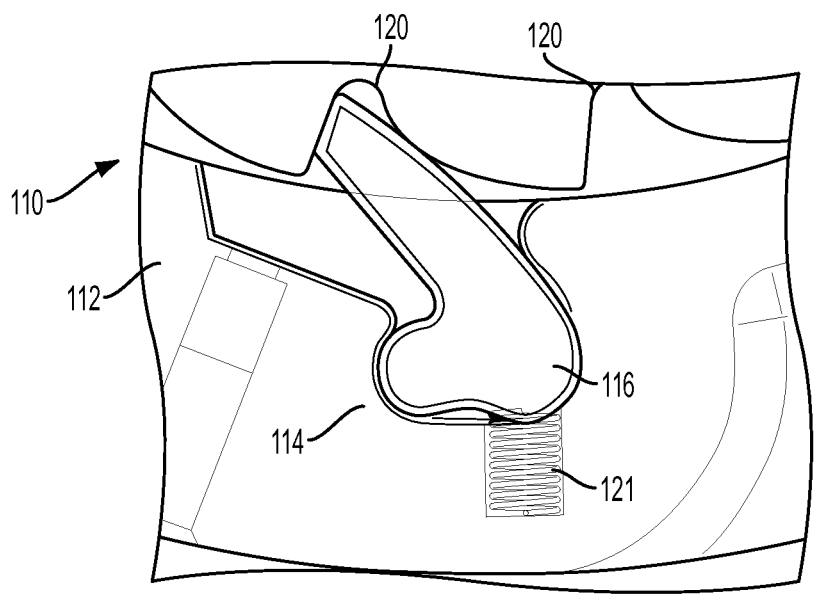
FIG. 6 is a detail view of an electromagnetic one-way clutch.

Referring now to FIGS. 5 and 6, a rocker one-way clutch 110 (which may be an electromagnetic clutch) as may be used in conjunction with the present disclosure is illustrated schematically. More specifically, the rocker one-way clutch may be used as the overdrive clutch 86 that is operable to selectively couple gear element 84 to the engine 16'. The one-way clutch 110 includes a rocker plate 112 having pockets 114, each pocket 114 containing a corresponding rocker 116 which is pivotally hinged within the respective pockets 114. The clutch 110 also includes a cam plate 118, which has a plurality of notches 120 that define teeth. When the rockers 116 are pivoted relative to the pockets 114, the teeth may catch inwardly extending portions of the rockers 116. The rockers 116 are biased by a spring 121 to remain within the pockets without protruding. In this configuration, there is no engagement between the rockers 116 and the notches 120, and thus no torque is transferred between the rocker plate 112 and cam plate 118. FIG. 5 illustrates the clutch 110 in this disengaged position.

The cam plate 118 contains a coil [not illustrated] that may be selectively electrified to produce a magnetic force and engage the clutch 110. In response to the magnetic force, the rockers 116 pivot outward from the pockets 114, against the bias force of the spring 121, such that a portion of the rockers 116 protrudes beyond a radially inward face of the rocker plate 112. The protruding portion of the rockers 116 may engage with the notches 120 and transfer torque between the rocker plate 112 and cam plate 118 in one direction of rotation. FIG. 6 illustrates the clutch 110 in this engaged position.

Figures 7A, 7B:
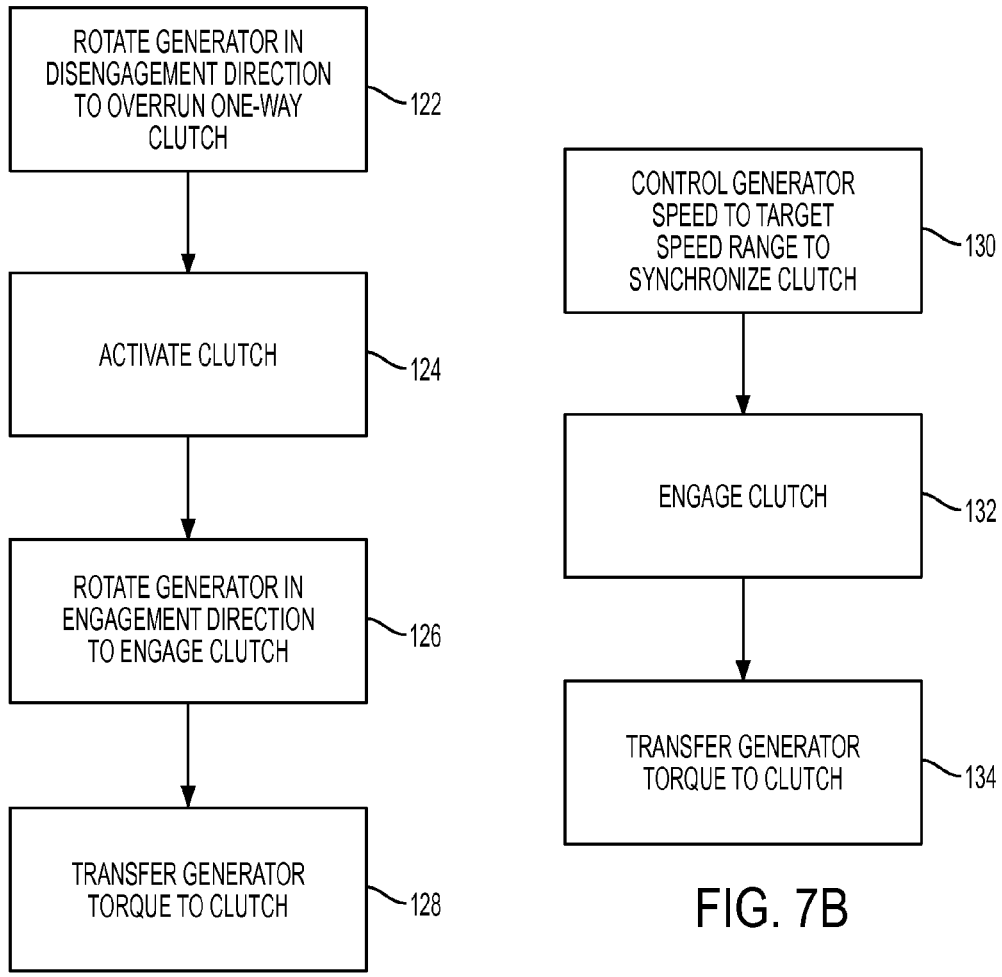
FIGS. 7A and 7B illustrate methods of engaging a one-way clutch and a dog clutch, respectively, according to the present disclosure in flowchart form.

Referring now to FIGS. 7A and 7B, methods of engaging a clutch are illustrated as may be used in conjunction with the present disclosure. FIG. 7A illustrates a method of engaging a one-way clutch. The generator is controlled to overrun the clutch, as illustrated at block 122. This may be performed by rotating the rocker plate in a disengagement direction. The clutch is then activated, as illustrated at block 124. As discussed above with respect to FIG. 6, this may include electrifying a coil to produce a magnetic field, in response to which rockers pivot and engage with notches in a cam plate. The clutch is then engaged, as illustrated at block 126. This is performed by rotating the rocker plate a short distance in an engagement direction to engage rockers with teeth in the cam plate. Torque carried by the generator is then transferred to the clutch, as illustrated at block 128.

FIG. 7B illustrates a method of engaging a dog clutch. A generator speed is controlled to a target speed to synchronize with the clutch, as illustrated at block 130. The clutch is then engaged, as illustrated at block 132. Torque carried by the generator is then transferred to the clutch, as illustrated at block 134.

Figure 8A:
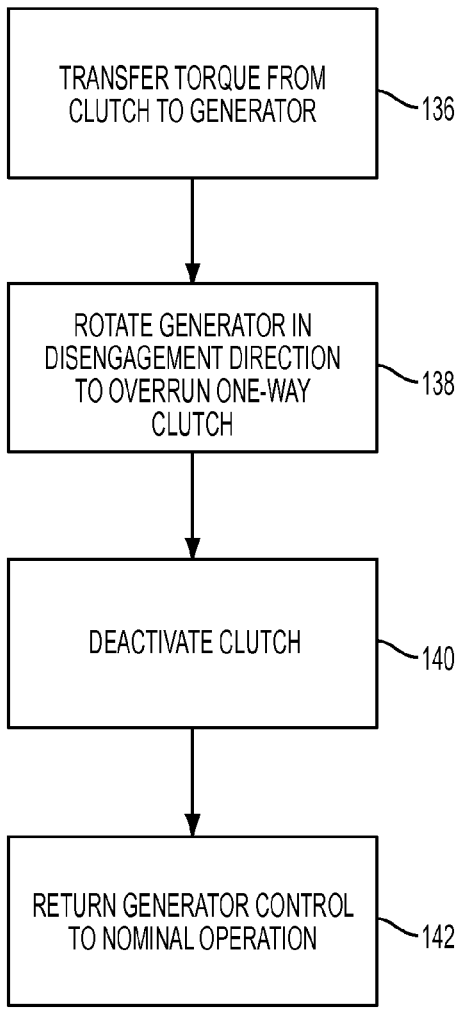
FIGS. 8A and 8B illustrate methods of disengaging a one-way clutch and a dog clutch, respectively, according to the present disclosure in flowchart form.
Figure 8B:
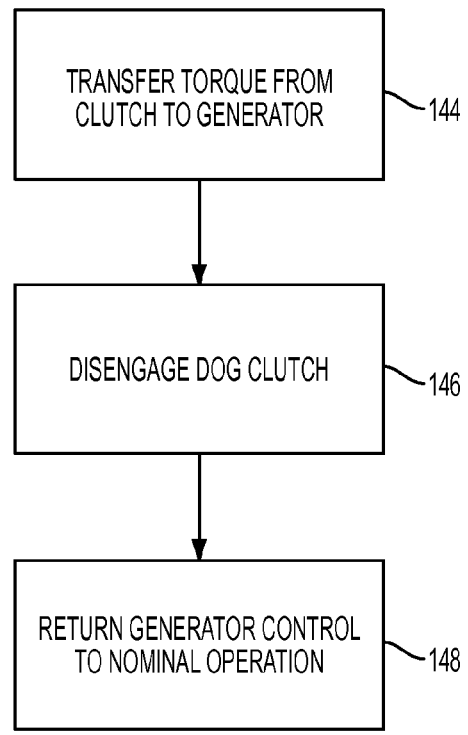

Referring now to FIGS. 8A and 8B, methods of disengaging a clutch are illustrated as may be used in conjunction with the present disclosure. FIG. 8A illustrates a method of disengaging a one-way clutch. Torque carried by the clutch is transferred to the generator, as illustrated at block 136. The generator is controlled to overrun the clutch, as illustrated at block 138. This may be performed by rotating the generator in the disengagement direction. The clutch is then deactivated, as illustrated at block 140. Generator control is then returned to nominal operation, as illustrated at block 142.

FIG. 8B illustrates a method of disengaging a dog clutch. Torque carried by the clutch is transferred to the generator, as illustrated at block 144. The clutch is then disengaged, as illustrated at block 146. Generator control is then returned to nominal operation, as illustrated at block 148.

According to various aspects of the present disclosure, a method and control system is provided for controlling the powertrain based on an estimated the amount of torque transferred through the overdrive clutch during engagement of the clutch to smooth the transition into and out of overdrive mode. To do so, a generator reaction ratio (GRR) can be determined and implemented into the normal powertrain torque calculations. The GRR is a ratio of generator torque to engine torque, accounting for the gears in the planetary gear arrangement 20':

$$GRR = -\frac{\tau_{gen}}{\tau_{eng}(\frac{\rho}{\rho+1})} = -\frac{\tau_{gen}(\frac{\rho+1}{\rho})}{\tau_{eng}} \tag{1}$$

where $\tau_{gen}$ is the torque of the generator 50', $\tau_{eng}$ is the torque of the engine 16', and $\rho$ is a ratio ($N_s/N_r$) of the number of teeth ($N_s$) in the sun gear 24' compared to the number of teeth ($N_r$) in the ring gear 22'. In one example, the sun gear 24' has 34 teeth ($N_s$=34) and the ring gear 22' has 86 teeth ($N_r$=86), yielding a ratio $\rho$ of 0.395.

Utilizing the GRR, torque values can be computed and compared to estimate the torque in the overdrive clutch. For example, $$\tau_{ODS} = -(1 - GRR)\left(\frac{N_{82}}{N_{84}}\right)(\tau_{eng}) \tag{2}$$

where $\tau_{ODS}$ is the torque transmitted through the overdrive clutch 66, $N_{82}$ is the number of teeth in gear element 82, and $N_{84}$ is the number of teeth in gear element 84. In one example, the gear element 84 has 83 teeth ($N_{84}$=83), and the gear element 82 has 59 teeth ($N_{82}$=59). The relationship in equation (2) provides an estimate of the torque transmitted through the overdrive clutch 86 based on the torque output by the engine and the ratio of generator torque to engine torque (GRR), accounting for the gear ratio in the overdrive meshing gear elements 84 and 82.

Additionally, the torque through the ring gear 22' during synchronization of the overdrive clutch can be represented as follows:

$$\tau_{ring} = \frac{1}{\rho+1}(\tau_{eng})(GRR) \quad (3)$$

where $\tau_{ring}$ is the torque transmitted through the ring gear 22'. The torque through the ring gear 22' ($T_{ring}$) can be utilized in the main controls of the powertrain which are not described in detail in the present disclosure.

Knowing the estimated torque transferred through the overdrive clutch ($T_{ODS}$), the outputs of the engine 16' and the motor 46' can be controlled to assure a smooth transition into, or out of, overdrive mode, when the overdrive clutch is transitioning between being engaged and disengaged. For example, the overdrive clutch torque to the wheels can be represented as follows:

$$\tau_{ODS \to O} = -\tau_{ODS}\left(\frac{N_{36'}}{N_{34'}}\right) \quad (4)$$

where $T_{ODS \to O}$ is the overdrive clutch torque to the output shaft 38', accounting for a gear ratio $$\left(\frac{N_{36'}}{N_{34'}}\right),$$

and $N_{34'}$ and $N_{36'}$ are the number of teeth on gears 34' and 36', respectively, that transfer torque from the overdrive clutch to the output shaft 38'. Of course, any number of gear ratios can be present that effectively change the rotational speed while transmitting torque therethrough. In one example, $N_{34'}$ is 23, and $N_{36'}$ is 59, yielding a gear ratio of 2.565.

Using the variables and findings described above, the overall torque transferred through the output shaft 38' can be represented by the following:

$$\tau_{out} = \frac{C_{R \to O}}{1+\rho} \cdot \tau_{eng} \cdot GRR + \tau_{M \to O} + (\tau_{ODS \to O}) \quad (5)$$

where $\tau_{out}$ is the torque transferred through the output shaft 38', $C_{R \to O}$ is the gear ratio conversion from the ring gear to the output (i.e., accounting for gears 28', 30', 34', and 36'), and $\tau_{M \to O}$ is the motor torque at the output, accounting for gear ratio conversions (i.e., accounting for gears 44', 32', 34', and 36'). Please note that $$\frac{C_{R \to O}}{1+\rho} \cdot \tau_{eng} \cdot GRR$$

may also be rewritten as $\tau_{ring \to O}$. The gear ratio conversion from the ring gear to the output $C_{R \to O}$ when multiplied by the engine torque $T_{eng}$ yields the engine torque at the output. Using equation (5) above, the torque output of the engine 16' and motor 46' can be modulated during engagement or disengagement of the overdrive clutch 86 to assure that the overall torque output $\tau_{out}$ meets a demanded torque while inhibiting shock realized when engaging or disengaging the overdrive clutch 86. For example, the output of the motor 46' may be modulated more quickly than that of the engine 16', and therefore the motor 46' may be controlled to increase or decrease its torque output based on the generator reaction ratio GRR and other relationships described above when the overdrove clutch 86 is engaged/disengaged. Other situations, such as during a low state of charge of the battery, may dictate that the engine output be modulated rather than the motor output. Of course, either or both of the engine and motor outputs may be controlled based on the relationships described above.

Figure 9:
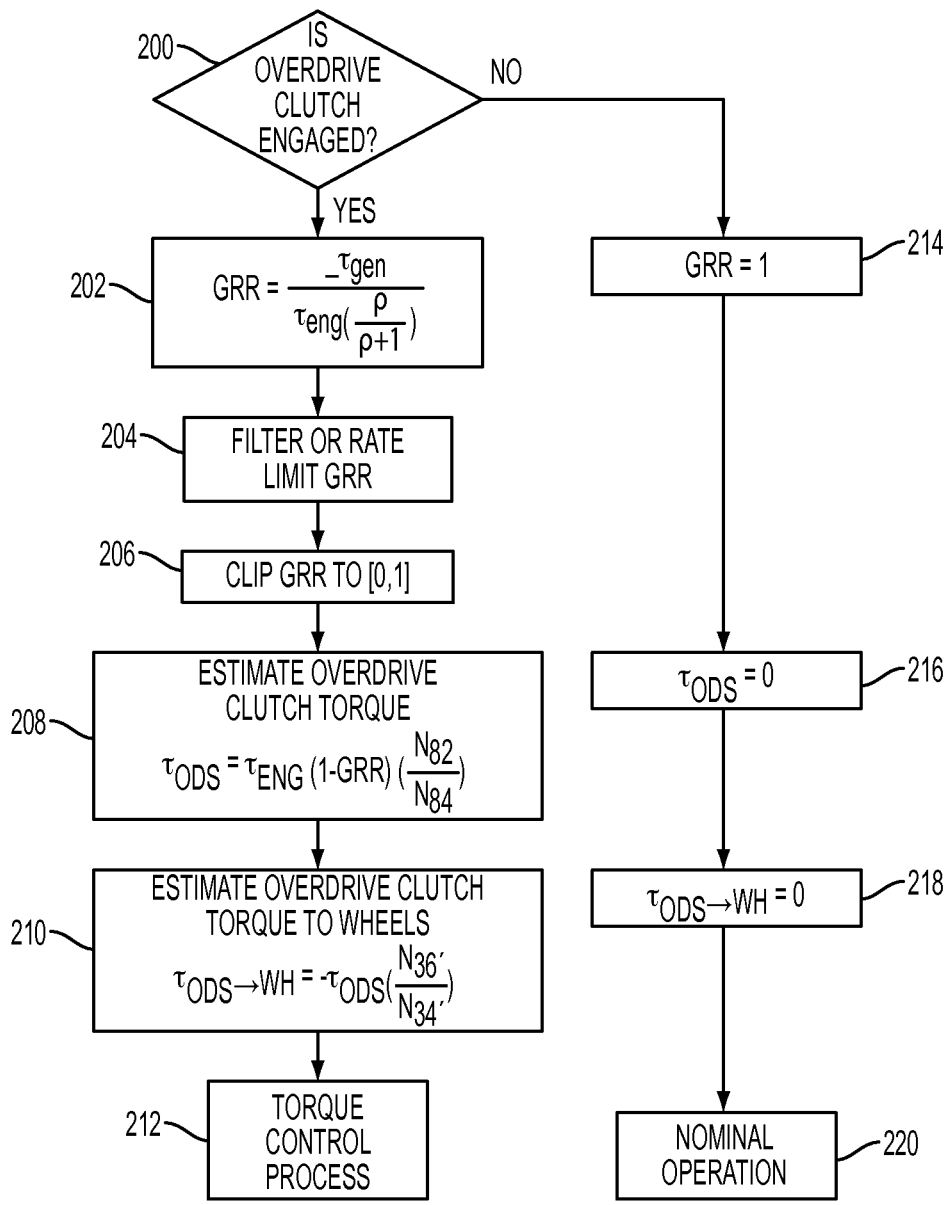

FIG. 9 illustrates an algorithm for controlling a powertrain according to the present disclosure in flowchart form. More specifically, the flowchart in FIG. 9 represents one example of a control strategy implemented by the controller to control at least one of the engine and motor based on an estimated torque transferred through the overdrive clutch 86, as further described above. At 200, the controller determines whether the overdrive clutch is engaged or disengaged. This can be accomplished in a variety of known fashions, such as by reading signal inputs from sensors in or around the clutch, or determining a rotational speed difference on opposing sides of the clutch.

If the clutch is at least partially engaged, including times in which the clutch is first commanded to engage and is "slipping," the generator reaction ratio (GRR) can be determined according to equation (1) above at 202. The GRR is filtered or subject to a rate limit at 204 to smoothen the GRR over time, preventing unwanted spikes of torque readings to interfere with operation of the engine or motor controls. At 206, the GRR is then clipped with 0 and 1 at a respective minimum and maximum so that the GRR is not be negative and does not exceed 1. The resulting GRR after 206 is a value between 0 and 1 to be used in overdrive clutch torque estimation.

At 208, the controller estimates the overdrive clutch torque utilizing the clipped and filtered GRR, according to equation (2). The estimated overdrive clutch torque can be used in calculating the estimated overdrive clutch torque at the output at 210, according to equation (4). Thereafter, a torque control process at 212 can be utilized by the controller to control the torque and power outputs of the engine and motor to maintain drivability of the vehicle, while meeting demanded torques and powers, particularly during times of entering and exiting the overdrive mode. For example, the motor torque may be modulated by an amount based on the GRR and other variables above in order to maintain driver demands.

If it is determined at 200 that the overdrive clutch is not engaged, the GRR is set to 1 at 214. This essentially withdraws any generator reaction ratio in any of the above equations, allowing the engine, motor and generator to operate under the nominal operation mode. Furthermore, there is no torque being transmitted through the open clutch as indicated at 216 and 218. The main drive process 220 is run in which the hybrid vehicle is controlled in a normal fashion, i.e., not in overdrive.

Figure 10:
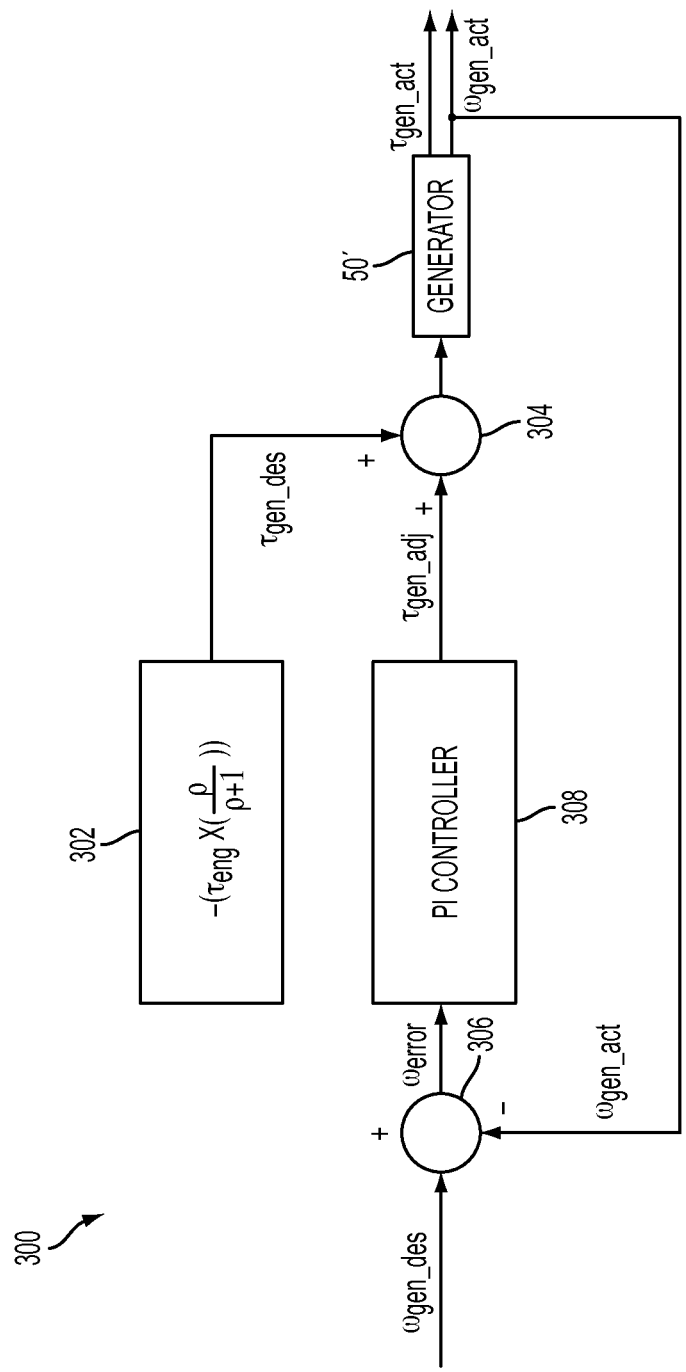
FIG. 10 illustrates an algorithm for controlling the generator, when operating in the nominal operation mode, in flowchart form.

Referring to FIG. 10 a control system 300 of the generator 50' when operating in the nominal operation mode is illustrated. A desired torque of the generator $\tau_{gen\_des}$ when operating in the nominal operation mode depends on the torque of the engine $\tau_{eng}$ and may be represented by the following:

$$\tau_{gen\_des} = -\left(\tau_{eng} \times \left(\frac{\rho}{\rho+1}\right)\right) \tag{6}$$

where $\tau_{gen\_des}$ is the desired torque of the generator 50', $\tau_{eng}$ is the torque of the engine 16', and $$\left(\frac{\rho}{\rho+1}\right)$$

is the gearing ratio between the engine 16' and the generator 50' with engine connected to the carrier assembly 26' and the generator 50' connected to the sun gear 24'. The desired torque of the generator $\tau_{gen\_des}$ is represented by the block 302 and is fed forward into a summation node 304 where a generator adjustment torque value $\tau_{gen\_adj}$ is added to the desired torque of the generator $\tau_{gen\_des}$. The summation of the desired torque of the generator $T_{gen\_des}$ and the generator adjustment torque value $\tau_{gen\_adj}$ is then commanded to the generator 50'. The generator 50' then outputs an actual torque $\tau_{gen\_act}$ and an actual speed $\omega_{gen\_act}$. The actual speed of the generator $\omega_{gen\_act}$ is used as a feedback into a summation node 306 where the actual speed of the generator $\omega_{gen\_act}$ is subtracted from a desired speed of the generator $\omega_{gen\_des}$ resulting in a generator speed error $\omega_{error}$. The generator speed error $\omega_{error}$ is input into a feedforward controller 308 that generates the generator adjustment torque value $\tau_{gen\_adj}$ that is added to the desired torque of the generator $\tau_{gen\_des}$ at the summation node 304. The feedforward controller 308 may include any combination of a proportional term, an integral term, and a derivative term, but preferably is a proportional integral (PI) controller.

Figure 11A:
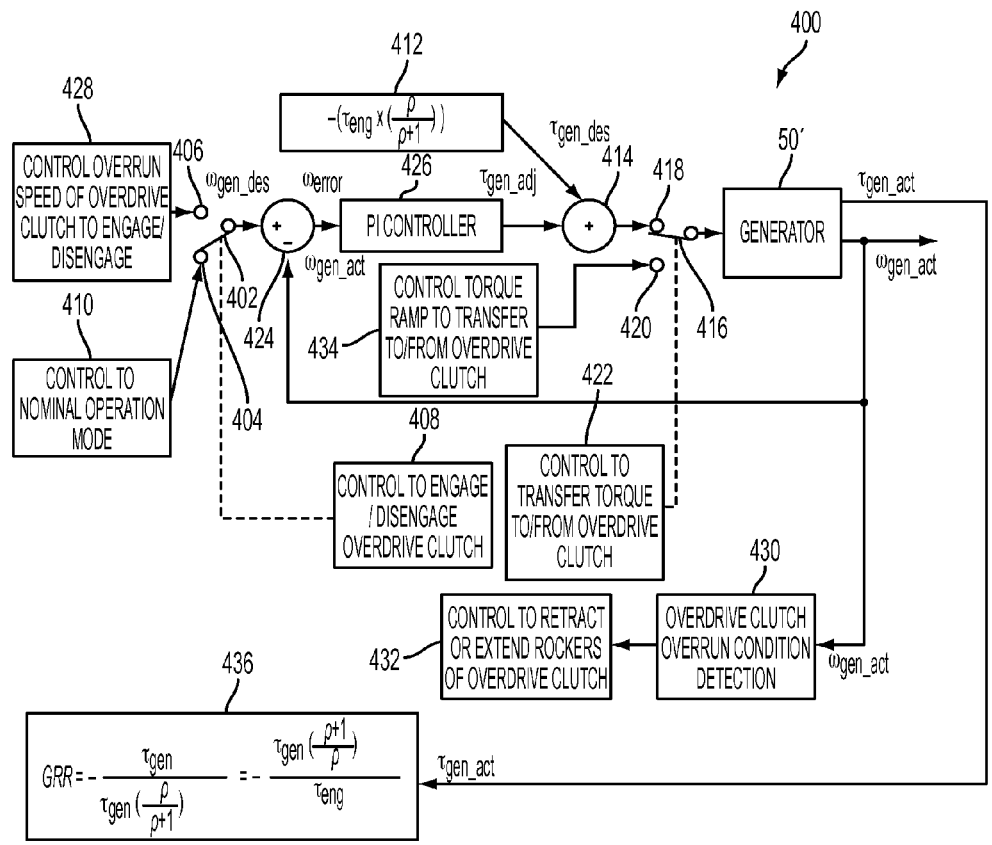
FIG. 11A illustrates an algorithm for controlling the generator, including a nominal operation mode and an overdrive operation mode, in flowchart form.

Referring to FIG. 11A, a modified control system 400 of the generator 50' is illustrated. The modified control system 400 includes operation of the generator 50' in the nominal mode, the overdrive mode, and during a transition between the overdrive and nominal operation modes. The overdrive clutch 86 utilized in the modified control system 400 may be a rocker one-way type clutch and is illustrated as such. However, it should be understood that other types of one-way clutches that employ other types of engagement mechanisms may be utilized as well as rocker one-way clutches.

When operating the generator 50' in the nominal operation mode, the control system 400 operates under the same parameters as control system 300. In the nominal mode a first switching element 402 is connected to a first switching node 404 and disconnected from a second switching node 406. Control block 408 controls the engagement and disengagement of the overdrive clutch 86 through the first switching element 402. The first switching element 402 is connected to control block 410 through first switching node 404. When the first switching element 402 is connected to control block 410, the control system is either operating in the nominal operation mode or is returning to the nominal operation mode by controlling the generator 50' to a base speed of the nominal operation mode. The desired torque of the generator $\tau_{gen\_des}$ is represented by the block 412 and is fed forward into a summation node 414 where a generator adjustment torque value $\tau_{gen\_adj}$ is added to the desired torque of the generator $\tau_{gen\_des}$. The summation of the desired torque of the generator $\tau_{gen\_des}$ and the generator adjustment torque value $\tau_{gen\_adj}$ is then commanded to the generator 50', through a second switching element 416 which connected to a first switching node 418 and disconnected from a second switching node 420, when the control system 400 is in the nominal operation mode. The second switching element 416 is connected to control block 422. Control block 422 controls the torque transfer to and from the overdrive clutch 86. The generator 50' then outputs an actual torque $\tau_{gen\_act}$ and an actual speed $\omega_{gen\_act}$. The actual speed of the generator $\omega_{gen\_act}$ is used as a feedback into a summation node 424 where the actual speed of the generator $\omega_{gen\_act}$ is subtracted from a desired speed of the generator $\omega_{gen\_des}$ resulting in a generator speed error $\omega_{error}$. The generator speed error $\omega_{error}$ is input into a feedforward controller 426 that generates the generator adjustment torque value $\tau_{gen\_adj}$ that is added to the desired torque of the generator $\tau_{gen\_des}$ at the summation node 414. The feedforward controller 426 may include any combination of a proportional term, an integral term, and a derivative term, but preferably is a proportional integral (PI) controller.

When transitioning the generator 50' from the nominal operation mode to the overdrive operation mode, the first switching element 402 is disconnected from the first switching node 404 and connected to the second switching node 406. The first switching element 402 is then connected to control block 428 through second switching node 406. Control block 428 controls the generator 50' to a desired overrun speed of the overdrive clutch 86. Once the actual speed of the generator $\omega_{gen\_act}$ obtains a desired overrun speed of the overdrive clutch 86 and is detected at sensing block 430, the rockers of the overdrive clutch 86 are extended at block 432. Once the rockers of the overdrive clutch are extended, the generator 50' speed is slowed down to a synchronous speed to land the overdrive clutch 86. Once the overdrive clutch is landed, the second switching element 416 is disconnected from the first switching node 418 and connected to the second switching node 420. The second switching element is then connected to control block 434 through the second switching node 420. Control block 434 then controls the generator 50' to ramp the torque off of the planetary gearing arrangement 20' and onto the overdrive clutch 86. The actual torque of the generator $\tau_{gen\_act}$ generator is input into block 436 where the generator reaction ratio (GRR) is tracked. The GRR may be tracked during all times of operation including the overdrive mode, nominal mode, and during transitions between the overdrive and nominal modes.

When transitioning generator 50' from the overdrive operation mode to the nominal operation mode, the second switching element is connected to control block 434 through the second switching node 420. Control block 434 then controls the generator 50' to ramp the torque off of the overdrive clutch 86 and onto the planetary gearing arrangement 20'. Again, the actual torque of the generator $\tau_{gen\_act}$ generator is input into block 436 where the generator reaction ratio (GRR) is tracked. Once the torque is ramped off of the overdrive clutch, the second switching element disconnects from the second switching node 420 and connects to the first switching node 418. Then, with the first switching element 402 connected to control block 428 through second switching node 406, control block 428 controls the generator 50' to a desired overrun speed of the overdrive clutch 86. Once the actual speed of the generator $\omega_{gen\_act}$ obtains a desired overrun speed of the overdrive clutch 86 and is detected at sensing block 430, the rockers of the overdrive clutch 86 are retracted at block 432. Once the rockers of the overdrive clutch are retracted, the first switching element 402 is disconnected from the second switching node 406 and connected to control block 410 through the first switching node 404. Control block 410 then controls the generator 50' to a base speed and returns to the nominal operation mode. A condition requiring transitioning from the overdrive operation mode to the nominal operation mode may include, but is not limited to, any of the third operating conditions 106 found in FIG. 4.

In addition, when transitioning from the overdrive mode to the nominal operation mode, the generator torque required to ramp the torque off of the one-way clutch 86 and onto the planetary gearing arrangement 20' will increase as the value of the torque that has been transferred to the one-way overdrive clutch $\tau_{OD\_Clutch}$ increases. Furthermore, the torque of the generator 50' may be increased by control block 434 when disengaging the overdrive clutch 86 by generating a torque command at control block 434 that is equal to the torque that has been transferred to the one-way overdrive clutch $\tau_{OD\_Clutch}$. A torque command by control block 434 that is equal to the torque that has been transferred to the one-way overdrive clutch $\tau_{OD\_Clutch}$ allows a quick boost in torque that should be close to the amount of torque required to ramp the torque off of the overdrive clutch 86 and onto the planetary gearing arrangement 20'. Additional torque may be added after the initial torque command as required to transfer all of the torque off the overdrive clutch 86 and onto the planetary gearing arrangement 20', resulting in zero or negligible torque on the overdrive clutch.

The torque that has been transferred to the one-way overdrive clutch 86 when operating in the overdrive mode or when transitioning between the overdrive and nominal operation modes depends on the torque of the engine $\tau_{eng}$ and the generator reaction ratio (GRR), and may be represented by the following:

$$\tau_{OD\_Clutch} = (1-GRR)\tau_{eng} \quad (7)$$

where $\tau_{OD\_Clutch}$ is the torque that has been transferred to the one-way overdrive clutch 86 from the planetary gear arrangement 20', $\tau_{eng}$ is the torque engine 16', and GRR is the generator reaction ratio.

Figure 11B:
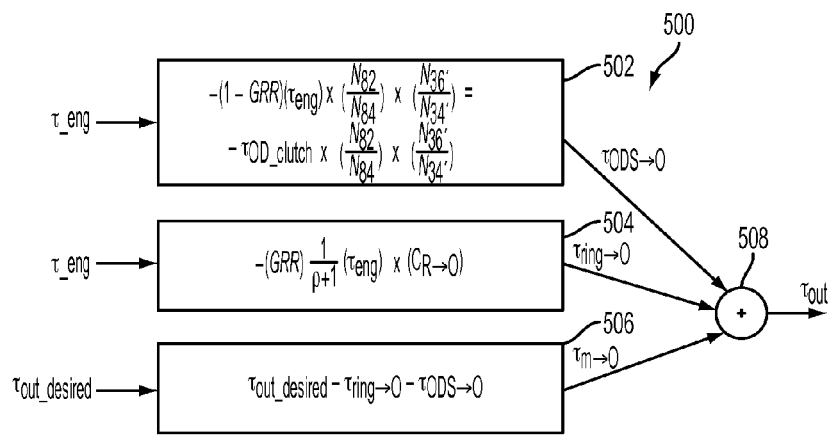
FIG. 11B illustrates the overall torque output of the hybrid vehicle powertrain in flowchart form.

Referring to FIG. 11B, a control system 500 of the overall torque output of the hybrid vehicle powertrain is illustrated. Engine torque $\tau_{eng}$ is input into block 502 and the overdrive clutch torque at the output shaft 38' $\tau_{ODS\_O}$ is generated as the output of block 502. The function in block 502 may represented by the following:

$$\tau_{ODS \to O} = -(1 - GRR)(\tau_{eng})\left(\frac{N_{82}}{N_{84}}\right)\left(\frac{N_{36'}}{N_{34'}}\right) = \tau_{OD\_Clutch}\left(\frac{N_{82}}{N_{84}}\right)\left(\frac{N_{36'}}{N_{34'}}\right) \quad (8)$$

Engine torque $\tau_{eng}$ is input into the block 504 and ring gear torque at the output shaft 38' $\tau_{ring\_O}$ is generated as the output of the block 504. The function in block 504 may represented by the following:

$$\tau_{ring} = -(GRR)\frac{1}{1+\rho}(\tau_{eng}) \times (C_{R \to O}) \quad (9)$$

Desired torque at the output shaft 38' $\tau_{out\_desired}$ is input into the block 506 and motor torque at the output shaft 38' $\tau_{M\_O}$ at the output shaft 38' is generated as the output of the block 506. The function in block 506 may be represented by the following:

$$\tau_{M \to O} = \tau_{out\_desired} - \tau_{ring \to O} - \tau_{ODS \to O} \quad (10)$$

The overdrive clutch torque at the output shaft 38' $\tau_{ODS\_O}$, ring gear torque at the output shaft 38' $\tau_{ring\_O}$, and the motor torque at the output shaft 38' $\tau_{M\_O}$ are then summed together at summation node 508 resulting in the overall torque transferred through the output shaft 38' $\tau_{out}$.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   an engine and electric machine connected to a planetary gear;
   a one-way clutch configured to transfer torque from the planetary gear to an overdrive gear; and
   a controller programmed to, responsive to a power demand increasing or decreasing, braking, a vehicle speed decreasing, or an engine shutdown request, each requiring one-way clutch disengagement, increase an electric machine torque based on the torque transferred from the planetary gear to the overdrive gear.

2. The vehicle of claim 1, wherein the controller is further programmed to increase the torque of the electric machine until the torque transferred to the overdrive gear becomes zero.

3. The vehicle of claim 2, wherein the controller is further programmed to, in response to the torque transferred to the overdrive gear becoming zero, adjust a speed of the electric machine such that the one-way clutch achieves an overrunning state.

4. The vehicle of claim 3, wherein the controller is further programmed to, in response to the one-way clutch achieving the overrunning state, retract an engagement mechanism of the one-way clutch.

5. The vehicle of claim 4, wherein the controller is further programmed to, in response to retracting the engagement mechanism of the one-way clutch, exit an overdrive mode and adjust the speed of the electric machine to enter a nominal operation mode.

6. The vehicle of claim 4, wherein the one-way clutch is an electromagnetic rocker one-way clutch and wherein the controller is further programmed to, in response to the electromagnetic rocker one-way clutch being electronically deactivated, retract the rockers of the electromagnetic rocker one-way clutch.

7. A hybrid vehicle comprising:
   a planetary gear set including sun, carrier, and ring gears, the ring gear configured to transfer torque to a traction wheel;

an engine connected to the carrier and configured to transfer torque to the planetary gear set;

an overdrive gear configured to transfer torque from the engine to the traction wheel;

a one-way clutch configured to transfer torque from the planetary gear set to the overdrive gear when switching between powertrain nominal and overdrive operation modes;

a generator connected to the sun gear and configured to overrun the one-way clutch when rotated in a disengagement direction; and a controller programmed to, in response to a condition requiring switching from the powertrain overdrive mode to the powertrain nominal operation mode, alter a torque of the generator in the disengagement direction according to a torque command that is based on the torque transferred from the planetary gear set to the overdrive gear.

8. The vehicle of claim 7, wherein the controller is further programmed to alter the torque of the generator until the torque transferred to the overdrive gear becomes zero.

9. The vehicle of claim 8, wherein the controller is further programmed to, in response to the torque transferred to the overdrive gear becoming zero, adjust a speed of the generator such that the one-way clutch achieves an overrunning state.

10. The vehicle of claim 9, wherein the controller is further programmed to, in response to the one-way clutch achieving the overrunning state, retract an engagement mechanism of the one-way clutch.

11. The vehicle of claim 10, wherein the controller is further programmed to, in response to retracting the engagement mechanism of the one-way clutch, exit the powertrain overdrive mode and adjust the speed of the generator to enter the powertrain nominal operation mode.

12. The vehicle of claim 10, wherein the one-way clutch is an electromagnetic rocker one-way clutch and wherein the controller is further programmed to, in response to the electromagnetic rocker one-way clutch being electronically deactivated, retract the rockers of the electromagnetic rocker one-way clutch.

13. The vehicle of claim 7, wherein the condition is a decrease in power demand, an increase in power demand, braking, a decrease in vehicle speed, or an engine shutdown request.

14. A method of controlling a vehicle having an engine and an electric machine connected to a planetary gear set, and a one-way clutch configured to transfer torque from the planetary gear set to an overdrive gear, the method comprising:

in response to a condition requiring disengagement of the one-way clutch, increasing a torque of the electric machine based on the torque transferred from the planetary gear set to the overdrive gear until the torque being transferred to the overdrive gear becomes zero; and in response the torque transferred to the overdrive gear becoming zero, adjusting a speed of the electric machine such that the one-way clutch achieves an overrunning state.

15. The method of claim 14 further comprising, in response to the one-way clutch achieving the overrunning state, retracting an engagement mechanism of the one-way clutch.

16. The method of claim 15, further comprising, in response to retracting the engagement mechanism of the one-way clutch, exiting an overdrive mode, and adjusting the speed of the electric machine to enter a nominal operation mode.

* * * * *